United States Patent Office 3,138,125
Patented June 23, 1964

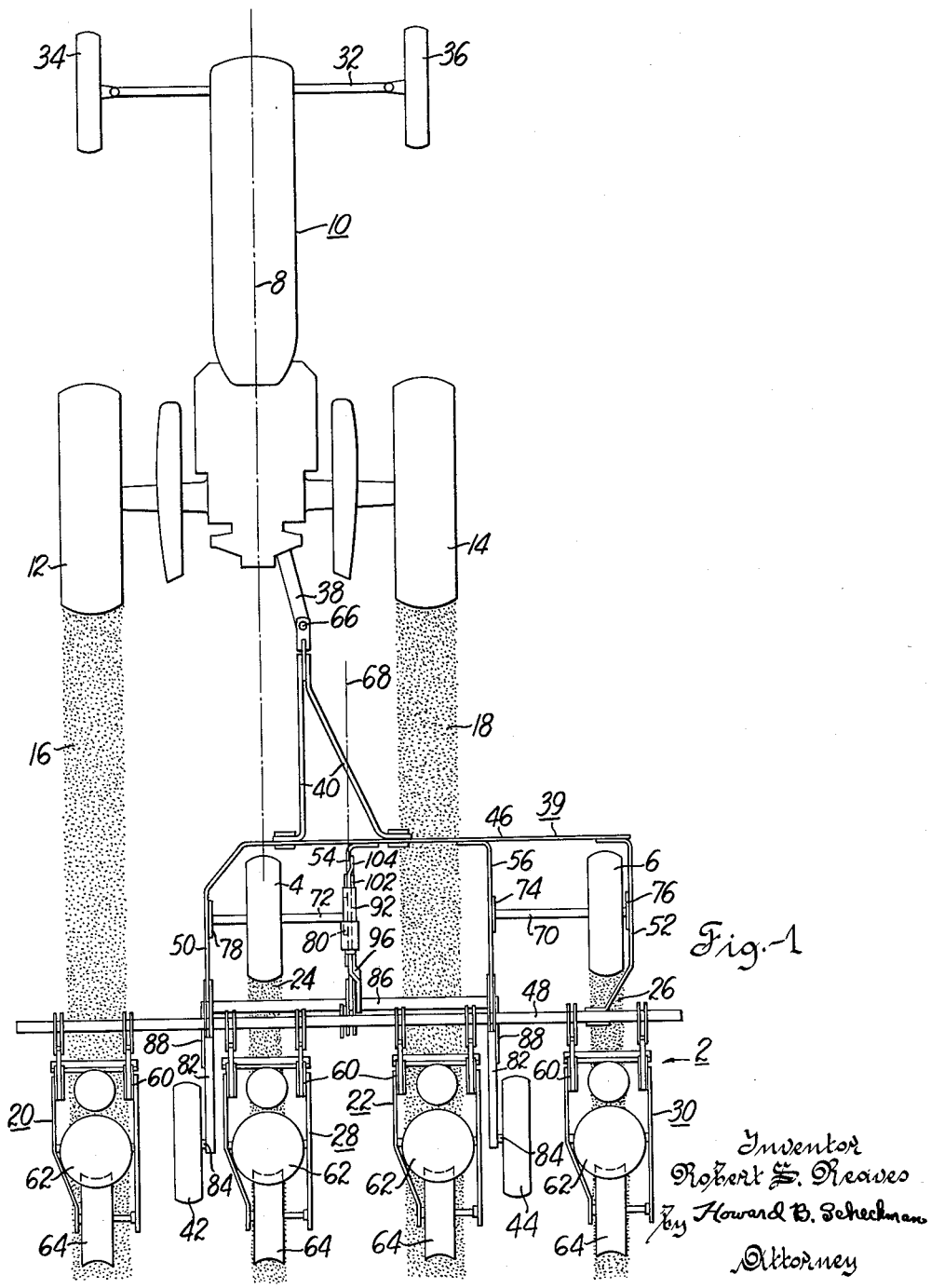

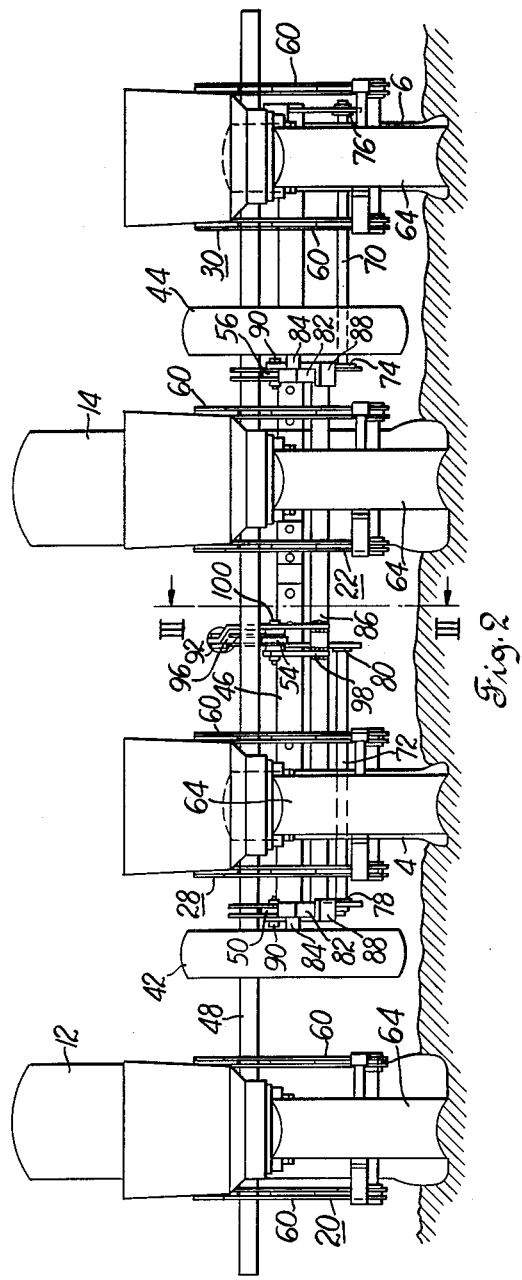

3,138,125
WHEEL TRACK PLANTER
Robert S. Reaves, Waukesha, Wis., assignor to Allis-Chalmers Manufacturing Company, Milwaukee, Wis.
Filed May 1, 1961, Ser. No. 106,638
2 Claims. (Cl. 111—52)

This invention relates to farm implements and more specifically to an implement that can be used for wheel track planting.

The basic concept of wheel track planting is well known. See for example, U.S. Patent 2,930,335 and the art cited therein relating to this type of planting.

One of the difficulties with wheel track planting is that present day harvesting equipment, such as corn pickers, are designed to operate at standard width rows, or around 40 inches. If a standard width row is not used in wheel track planting, it means that the harvesting equipment has to be modified or cannot be used. It therefore is not yet practical to plant at row spacings other than standard widths.

One solution has been to modify the tractor to plant at these standard row widths. Where four rows are being planted to requires a lot of modification. If the tractor is modified, to provide wheel tracks at standard width rows, it is expensive, makes the tractor awkward, unsafe, and hard to maneuver. It also ties up the tractor until the crop has been planted.

On the other hand, to provide a planter with a packer wheel for each planter unit is expensive and makes the planter awkward. Also, the tractor leaves undesirable tracks in the ground in addition to the tracks used for planting.

It is an object of this invention to provide an implement used in wheel track planting that does not require that the tractor be modified.

It is another object of this invention to provide an implement used in wheel track planting that can be easily connected to or disconnected from, the tractor without tying the tractor up.

It is another object of this invention to provide an implement used in wheel track planting, that makes wheel tracks that cooperate with the tractor's wheel tracks to form standard width rows.

Other objects and advantages will appear from the following description considered in conjunction with the attached drawings, in which:

FIG. 1 is a plan view of a tractor and an attached implement, the implement being offset from the tractor to plant four rows;

FIG. 2 is a rear view of FIG. 1, showing the wheel tracks made by the tractor's rear wheels and the packer wheels, as well as the transport wheels being carried out of contact with the ground; and FIG. 3 is a sectional view of FIG. 2 taken in the direction of arrows III—III showing the planter frame structure as well as the arrangement for raising the transport wheels.

Invention Broadly

Referring to FIG. 1, the invention broadly contemplates providing an implement 2 such as a four row planter, with two weighted packer wheels 4, 6. Implement 2 is offset relative to center line 8 of tractor 10. With this setup the tractor's rear wheels 12, 14 form tracks 16, 18 for first and third planter units 20, 22. And, the two weighted packer wheels 4, 6 form tracks 24, 26 for second and fourth planter units 28, 30.

The tractor's rear wheels 12, 14 cooperate with weighted packer wheels 4, 6 to form two pair of packer wheels that form wheel tracks for the planter units.

Invention Specifically

Referring to FIG. 1 there is disclosed a tractor 10. It has a wide front axle 32 with front wheels 34, 36 and spaced rear wheels 12, 14. The tractor is of the type where the rear wheels or tires can be moved closer or further apart as is well known in the art.

Normally the space between front wheels 34 and 36 is made the same as the space between the rear wheels 12 and 14 of the tractor 10. In this way the small, light, front wheels will leave tracks that will be run over and covered by the broader heavier rear wheels.

Connected to the rear of the tractor is a drawbar member 38 that can be swung to various positions depending on the offset it is desired to impart to the implement. Drawbar 38 can be locked in various positions.

Connected to tractor 10 is implement 2 illustrated as a four row planter. The implement includes five major parts:
(1) Frame 39;
(2) Plural planter units 20, 22, 28 and 30 carried by the frame;
(3) Hitch 40 to connect frame 39 to tractor 10;
(4) Weighted packer wheels 4, 6; and
(5) Transport wheels 42, 44 also carried by the frame.

Frame

Frame 39 includes front and rear members 46, 48 that are connected by side members 50, 52, and support members 54, 56 carried between side members 50, 52. Rear member 48 is connected to the side and support members by suitable means such as clamp 58 (FIG. 3).

Planter Units

Four planter units 20, 22, 28 and 30 are connected to rear frame member 48. Each planter unit is carried by supporting structure 60, that also carries a fertilizer hopper 62 and press wheel 64.

Hitch

Tongue or hitch 40 interconnects tractor 10 and implement 2. Means in the form of a pivot member 66 pivotally connects the front of hitch 40 to tractor drawbar 38. The rear of the hitch is fixed to front frame member 46. The hitch is offset with respect to center line 68 of the implement.

Packer Wheels

Implement 2 is provided with two weighted packer wheels 4 and 6. These wheels form tracks 24, 26 for planter units 28, 30 that do not follow in the tractor's rear tire tracks.

The packer wheels are carried by axles 70, 72. Axle 70 is rotatably supported in bearings 74, 76 carried by frame members 52, 56. And, axle 72 is rotatably supported in bearings 78, 80 (FIG. 3) carried by frame members 50, 54.

Transport Wheels

Implement 2 may be provided with transport wheels 42, 44.

Referring to FIG. 1 each transport wheel is connected to one end of a leg 82 by an axle 84. The other end of leg 82 (FIG. 3) is fixed to bar member 86 by brace 88. Brace 88 is connected to pivot 90 to frame member 50.

The wheels are moved vertically by hydraulic ram 92, piston rod 94, and an arm 96. Arm 96 (FIG. 2) is pivotally connected to support 54 by pivot 100. Arm 96 is fixed to bar 86. Plate 98 also connects pivot 100 to bar 86 to equalize the load on pivot 100. End 102 of ram 92 is connected to bracket 104 fixed to frame member 54.

When piston rod 94 is retracted, the transport wheels will be raised entirely off the ground as shown in FIGS. 2 and 3. When the piston rod is extended, the transport wheels will be moved to transport position. Raising the wheels out of contact with the ground eliminates the undesirable track between the rows that would be left if the transport wheels were in contact with the ground during planting.

*Operation*

When it is desired to wheel track plant, hitch 40 of implement 2, that is laterally offset from center line 68 of the planter, is pivotally connected to drawbar 38 of tractor 10.

Hydraulic ram 92 is actuated to raise transport wheels 42, 44 to lower planting units 20, 22, 28, 30 into the ground. The depth of the planting units is controlled by gauge wheels 64 connected to each planting unit.

A first pair of row planting units is represented by the planting units 20 and 30 and is mounted on the frame 39 at a lateral spacing from each other which, in the illustrated embodiment of the invention as shown in FIG. 1, is one and one-half times the axial spacing of the ground engaging tractor supporting wheels 12 and 14. Hitch means represented by the tongue 40 and drawbar 38 are operatively interposed between the tractor 10 and implement frame 39 so as to position the row planting unit 20 in tracking alignment with the tractor wheel 12, and the row planting unit 30 laterally outward beyond the track of the tractor wheel 14. The weighted packer wheel 6 is mounted on the implement frame 39 forwardly of and in tracking alignment with the row planting unit 30.

A second pair of row planting units is represented by the planting units 22 and 28 and is mounted on the implement frame 39 intermediate the first pair of row planting units 20, 30 so that the unit 22 is positioned in tracking alignment with the tractor wheel 14, and so that the unit 28 is positioned midway between the tracks 16 and 18 of the tractor wheels 12 and 14.

The weighted packer wheel 4 is mounted on the implement frame 39 forwardly of and in tracking alignment with the row planting unit 28 between the tracks 16 and 18 of the tractor wheels 12 and 14.

It will be noted that drawbar 38 is offset from center line 8 of the tractor and that hitch 40 is offset from center line 68 of the implement. The entire offset could be taken by either the hitch or drawbar alone. However, where the offset is taken by the drawbar, it makes the tractor difficult to steer. And, where the total offset is taken by the hitch the planter does not trail as well.

*Summary*

Some of the advantages of this invention, are:
(a) Simple implement construction,
(b) The tractor does not have to be modified, and
(c) The implement cooperates with the tractor so that the wheel tracks from both are used for planting.

Although a single embodiment of the present invention has been illustrated and described, it will be apparent to one skilled in the art that various changes and modifications may be made therein without departing from the invention as defined in the claims.

What is claimed is:

1. The combination of a tractor having a pair of rear wheels at a predetermined axial spacing from each other; a trailing implement frame; a first pair of row planting units mounted on said implement frame at a lateral spacing from each other substantially equal to one and one-half times said axial spacing of said tractor wheels; hitch means operatively interposed between said tractor and implement frame so as to position one of said first pair of planting units in substantial tracking alignment with one of said tractor wheels, and the other of said first pair of planting units laterally outward beyond the track of the other of said tractor wheels; a weighted packer wheel mounted on said implement frame forwardly of and in tracking alignment with said other planting unit; a second pair of row planting units mounted on said implement frame intermediate said first pair of row planting units, one unit of said second pair being positioned in substantial tracking alignment with said other tractor wheel, and the other unit of said second pair being positioned substantially midway between the tracks of said tractor wheels; and another weighted packer wheel operatively mounted forwardly of and in tracking alignment with said other planting unit of said second pair.

2. The combination set forth in claim 1 wherein said other weighted packer wheel is operatively mounted on said implement frame.

References Cited in the file of this patent

UNITED STATES PATENTS

| | | |
|---|---|---|
| 1,646,342 | Barry | Oct. 18, 1927 |
| 1,812,049 | Johnson | June 30, 1931 |
| 1,849,449 | Burrill | Mar. 15, 1932 |
| 1,975,237 | Paul | Oct. 2, 1934 |
| 2,354,886 | Silver | Aug. 1, 1944 |
| 2,561,614 | Dixon | July 24, 1951 |
| 2,596,902 | Krause | May 13, 1952 |
| 2,827,308 | Hedrick | Mar. 18, 1958 |
| 2,930,335 | Hage | Mar. 29, 1960 |

OTHER REFERENCES

"4-Row Wheel Track Planting," Successful Farming, volume 54, No. 12, December 1956 (pages 34 and 35 relied on).